Patented May 17, 1938

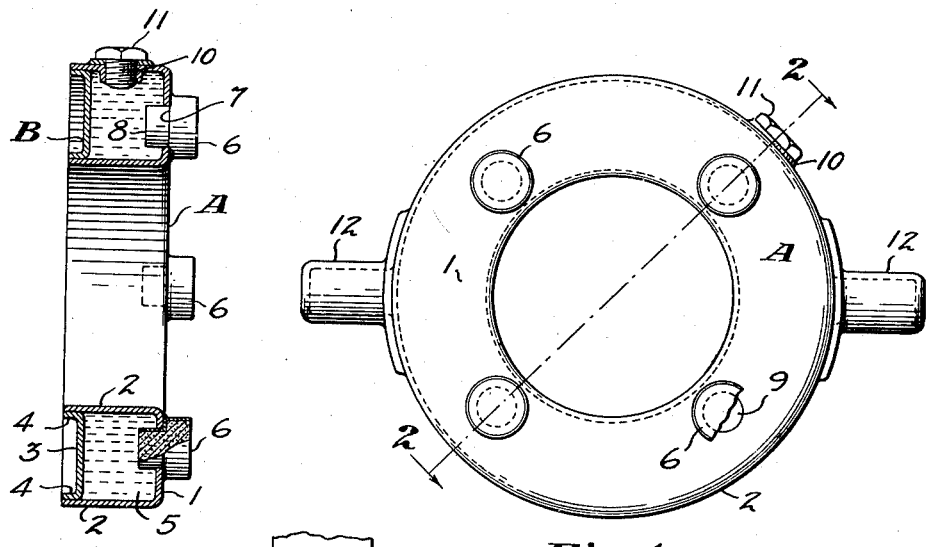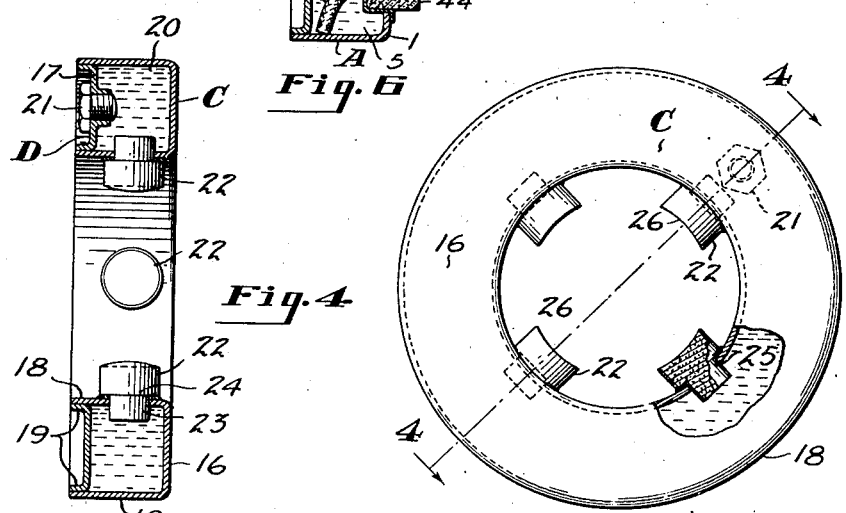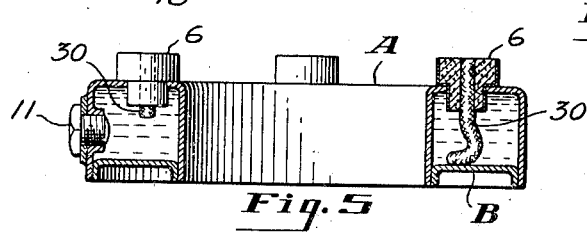

2,117,550

UNITED STATES PATENT OFFICE 2,117,550

SELF-LUBRICATING BEARING

Howard B. Eynon, and Myrtice C. Burr, St. Marys, Pa., assignors to Pure Carbon Company, Inc., St. Marys, Pa., a corporation of Pennsylvania Application May 20, 1935, Serial No. 22,405

13 Claims. (Cl. 308—171)

This invention relates to bearings and more particularly to self-lubricating bearings.

Self-lubricating bearings in which lubricant is conducted to a bearing surface through carbon or graphite elements have been used heretofore. Bearings in which the entire bearing surface is composed of carbonaceous material have also been used. However, in bearings of this character, in which a carbonaceous material is impregnated with oil or is supplied with oil from a reservoir, the movable member engaged therewith frequently becomes coated with a carbon film which, in the case where the moving member is a rotating shaft, tends to bind the bearing and shaft.

One of the objects of the present invention is to provide a self-lubricating bearing in which the possibility of the moving member engaged therewith becoming coated with a carbon film is minimized.

Another object is to provide a self-lubricating bearing having a lubricant reservoir with a plurality of spaced elements of carbon material, capable of not only forming the sole bearing surface of the bearing, but also conducting lubricant, without waste, to the member engaged therewith.

Another object is to provide a self-lubricating bearing which is simple in construction and economical to manufacture, and which is efficient in its operation.

With the above and other objects in view, the present invention consists in certain features of construction and combinations of parts to be hereinafter described with reference to the accompanying drawing and then claimed.

In the drawing, which illustrates suitable embodiments of the invention,

Figure 1 is an elevation of the thrust bearing of the present invention;

Fig. 2 is a transverse section taken approximately on line 2—2 of Fig. 1;

Fig. 3 is an end elevation of an annular bearing of the present invention;

Fig. 4 is a section taken on line 4—4 of Fig. 3; and

Figs. 5 and 6 are views similar to Fig. 2, but showing modified constructions.

Referring to the accompanying drawing, in which like numerals refer to like parts throughout the several views, Figures 1 and 2 show the invention in the form of a bearing such as is used in vehicle clutches, this bearing being commonly known as a clutch throwout collar, and Figures 3 and 4 show the invention in the form of an annular bushing.

The clutch throwout collar shown in Figures 1 and 2 comprises an annular metal outer member A having a radial portion 1 and spaced concentric circumferential flanges 2 and an inner member B likewise having a radial portion 3 and spaced concentric circumferential flanges 4. The flanges 4 are of lesser depth than the flanges 2 and the member B is nested within the member A with the axial portions 1 and 3 axially spaced so as to provide an annular reservoir 5. A flange 2 is continuously soldered or welded to the adjacent flange 4 to provide a liquid-tight connection therebetween. The adjacent flanges 2 and 4, however, may be continuously secured together in any other suitable manner, such for example as by means of a lock seam joint. Also, the member B may be reversed with respect to the direction of extension of its flanges, so that the flanges may extend toward the radial portion 1 of the member A.

In the bearing of the present invention the entire bearing surface is composed of graphite, carbon, or a combination of graphite with other carbons or metals, and is in the form of a plurality of spaced elements 6.

The individual elements 6 are sufficiently porous to conduct lubricant from the reservoir 5 and are capable of reducing friction themselves in the event the supply of lubricant becomes exhausted. Each of the elements 6 is formed in the shape of a button having a radial shoulder 7 for engagement with the radial face 1 of the member A and a shank 8 of reduced diameter. The entire surface of the elements 6, with the exception of the two end faces thereof, are preferably coated with copper.

The elements 6 are assembled to the sheet metal member A with the shank 8 extending through openings 9 in the radial portion 1 of the member A, so that the inner end faces thereof will be exposed to the supply of lubricant to be contained within the reservoir 5.

The radial shoulders 7 are also engaged with the radial face 1 and are soldered in place through the medium of the copper coating to securely hold the elements and form an oiltight seal around the openings 9.

The member A is formed with an opening 10 in its radial outer flange 2, so that the reservoir 5 may be filled with lubricant, and the opening 10 is provided with a suitable closure plug 11.

Suitable collar-supporting trunnions 12 are welded or otherwise secured thereto to form a support for the bearing when it is used in connection with a clutch.

The annular bearing construction shown in Figures 3 and 4 is of annular shape and comprises outer and inner annular sheet metal members C and D having radial portions 16 and 17 respectively, the radial portion 16 being provided with spaced circumferential flanges 18 and the radial portion 17 being provided with spaced circumferential flanges 19 fitting within and continuously secured to the flanges 18 to provide a closed reservoir 20.

A filler opening and closure plug 21 are provided in the member D or in any other suitable location so that the reservoir may be filled with lubricant.

The bearing face as in the previously described construction is composed entirely of graphite, carbon, or a combination of graphite with other carbons or metals and is also in the form of a plurality of spaced elements 22.

The elements 22 are formed with shanks 23 of reduced size to provide shoulders 24. These elements, which are sufficiently hard to act as a bearing surface and sufficiently porous to conduct lubricant, are assembled to the member C with the shanks 22 extending into the reservoir 20 through openings 25 formed in the radially inner flange 18. The external surfaces of the elements 22, with the exception of the end faces thereof, are coated with copper and the shanks 23 and shoulders 24 are soldered or otherwise permanently secured to the radial inner flange 18.

As this bearing is of the annular type, the outer faces 26 of the elements 22 are formed to an arcuate shape to engage with the circumferential surface of a shaft to be journaled therein.

In the construction shown in Figure 5 the unit comprises the stampings A and B and is substantially the same as the unit shown in Figure 2, with the exception that one or more of the bearing elements 6 is provided with a wick 30 of cotton, felt, or other suitable material which will assist in feeding lubricant to the bearing surface of the carbon element and provide for a more positive feed of lubricant where this is desired. The wick 30 may be of considerable length, as shown at the right in Figure 5, or it may project into the lubricant chamber 5 a short distance only, as shown at the left in Figure 5, or a combination of wicks of different lengths may be used.

Also, similar bearing elements may be substituted for the bearing elements 22 of Figures 3 and 4.

In the construction shown in Figure 6 the carbon element 40 is cylindrical and of uniform diameter from end to end and is pressed into a metallic cup 41 of copper or other suitable metal with a force fit, which is provided with a flange 42. The cup 41 with the carbon element assembled therein is inserted in the opening in the radial portion 1 of the element A and the flange 42 is soldered or welded to the portion 1 in a manner to prevent the escape of lubricant from the reservoir 5.

A wick 43 may also be provided in the carbon element 40 to extend to the bearing surface 44 thereof and to extend into the reservoir 5, as shown in Figure 6. If desired, the wick 43 may be omitted and the carbon element may be exposed to the lubricant through the opening in the bottom of the cup 41. Also, if desired, the circumferential surface of the carbon element which projects outwardly of the cup may be coated with copper.

The carbon element and mounting means shown in Figure 6 may be substituted, either with or without the wick, for the carbon element shown in Figures 3 and 4.

In each of the bearings described the bearing surface is composed entirely of a plurality of elements of carbon material which will conduct lubricant to the elements engaged therewith, without waste, as the exposed surfaces are coated with copper, which permits the passage of lubricant only to the bearing surface.

As long as there is lubricant within the reservoir the porous bearing elements will always serve as a means for conducting lubricant to the bearing surfaces, and even after the lubricant supply is exhausted will lubricate the bearing surface of the moving member for a time, because of the lubricant contained within the bearing elements.

Each of the bearing elements 6 and 22 may have its entire surface, except the bearing contact surface, coated with copper or other suitable material that will prevent loss of lubricant from the external surface, and only so much of the coating as may be necessary to properly lubricate the bearing surface removed from the portion of the element exposed to the lubricant. In some instances it has been found desirable to admit lubricant to some but not other of the bearing elements, because the elements lubricated from the oil reservoir will lubricate those that do not receive lubricant directly from the oil reservoir.

The bearing elements not only form the entire bearing surface of the bearing but also, since they are spaced apart, act as scrapers to keep the member which moves against the same free of films of carbonaceous material and foreign matter. This is particularly advantageous in the case of the annular bearing, as binding of the shaft and bearing is prevented. In solid bearings of carbonaceous material the shaft frequently binds within the bearing because of a film of carbonaceous material which accumulates thereon.

Each of the bearing constructions described is composed of a relatively few number of parts, which may be economically produced. Also, less frictional resistance is obtained in the bearing as the area of bearing contact is materially reduced as compared to conventional solid bearings.

Although we have shown and described the present invention in connection with the clutch throwout bearing and an annular bearing, its use is not limited to such bearings. It is also to be understood that various changes in construction may be made without departing from the spirit of the invention.

What we claim is:

1. A self-lubricating bearing comprising a metallic body member having a lubricant reservoir and a plurality of apertures in a wall thereof, and a plurality of spaced bearing elements of carbon material, said elements having their surfaces, with the exception of the inner and outer end faces, coated with metal, said elements having metal coated surfaces disposed within said apertures and being soldered to said body member.

2. A self-lubricating bearing comprising a metallic body member having a lubricant reservoir and a plurality of apertures in a wall thereof, and a plurality of spaced bearing elements of carbon material, said elements having their surfaces, with the exception of the inner and outer end faces, coated with copper, said elements being disposed within said apertures and being soldered to said body member.

3. A self-lubricating bearing comprising a metallic body member having a sealed lubricant reservoir therein and a plurality of apertures through a wall thereof, and a plurality of spaced bearing elements of carbon material, said elements having their outer surfaces with the exception of the inner and outer end faces thereof coated with metal and having metal coated surfaces disposed within said apertures with said inner end faces exposed to the supply of lubricant in said reservoir whereby to conduct lubricant to said outer end faces, said outer end faces constituting the sole bearing surface of the bearing, said elements being peripherally united to the walls of said apertures by a metal bond between the metal coating and metallic body.

4. A self-lubricating bearing comprising a metallic body member having a sealed lubricant reservoir therein and a plurality of apertures through a wall thereof, and a plurality of spaced bearing elements of carbon material, said elements having their outer surfaces with the exception of the inner and outer end faces thereof coated with copper and having metal coated surfaces disposed within said apertures with said inner end faces exposed to the supply of lubricant in said reservoir whereby to conduct lubricant to said outer end faces, said outer end faces constituting the sole bearing surface of the bearing, said elements being peripherally united to the walls of said apertures by a metal bond between the metal coating and metallic body.

5. A self-lubricating bearing comprising a metallic body member having a sealed lubricant reservoir therein and a plurality of apertures through a wall thereof, and a plurality of spaced bearing elements of carbon material, said elements having their outer surfaces with the exception of the inner and outer end faces thereof coated with metal and having metal coated surfaces disposed within said apertures with said inner end faces exposed to the supply of lubricant in said reservoir whereby to conduct lubricant to said outer end faces, said outer end faces constituting the sole bearing surface of the bearing, each of said elements having a circumferential shoulder engaged with and united to said body circumferentially about the element containing aperture by a metal bond between the metal coating and metallic body.

6. A self-lubricating bearing comprising a metallic body member having a sealed lubricant reservoir therein and a plurality of apertures through a wall thereof, and a plurality of spaced bearing elements of carbon material, said elements having their outer surfaces with the exception of the inner and outer end faces thereof coated with metal and being disposed within said apertures with said inner end faces exposed to the supply of lubricant in said reservoir whereby to conduct lubricant to said outer end faces, said outer end faces constituting the sole bearing surface of the bearing, each of said elements having a metal coated circumferential shoulder engaged with and soldered to said body circumferentially about the element-containing aperture.

7. A self-lubricating bearing comprising a metallic body member having a sealed lubricant reservoir therein and a plurality of apertures through a wall thereof, and a plurality of spaced bearing elements of carbon material, said elements having their outer surfaces with the exception of the inner and outer end faces thereof coated with metal and having metal coated surfaces disposed within said apertures with said inner end faces exposed to the supply of lubricant in said reservoir whereby to conduct lubricant to said outer end faces, said outer end faces constituting the sole bearing surface of the bearing, said elements being peripherally united to the walls of said apertures by a metal bond between the metal coating and metallic body, said body comprising a pair of annular sheet metal members, one of said sheet metal members having a radial portion and spaced circumferential flanges and the other of said sheet metal members being permanently and circumferentially secured to said flanges, said apertures being in said radial portion.

8. A self-lubricating bearing comprising a metallic body member having a sealed lubricant reservoir therein and a plurality of apertures through a wall thereof, and a plurality of spaced bearing elements of carbon material, said elements having their outer surfaces with the exception of the inner and outer end faces thereof coated with metal and having metal coated surfaces disposed within said apertures with said inner end faces exposed to the supply of lubricant in said reservoir whereby to conduct lubricant to said outer end faces, said outer end faces constituting the sole bearing surface of the bearing, said elements being peripherally united to the walls of said apertures by a metal bond between the metal coating and metallic body, said body comprising a pair of annular sheet metal members, one of said sheet metal members having a radial portion and spaced circumferential flanges and the other of said sheet metal members being permanently and circumferentially secured to said flanges, said apertures being in the radially innermost of said flanges.

9. A self-lubricating bearing comprising a body member having a lubricant reservoir therein and a plurality of spaced apertures in a wall thereof, and a plurality of spaced elements sealed within said apertures and having inner end faces exposed to the supply of lubricant in said reservoir, and outer end faces, said outer end faces being disposed to engage a moving part and constituting the sole bearing surface of the bearing, said elements being of carbon material whereby to conduct lubricant from said reservoir to said outer end faces, at least one of said elements having a lubricant conducting wick therein for conducting lubricant from said reservoir to the outer end face of the said element.

10. A self-lubricating bearing comprising a body member having a lubricant reservoir therein and a plurality of spaced apertures in a wall thereof, and a plurality of spaced elements sealed within said apertures and having inner end faces exposed to the supply of lubricant in said reservoir, and outer end faces, said outer end faces being disposed to engage a moving part and constituting the sole bearing surface of the bearing, said elements being of carbon material whereby to conduct lubricant from said reservoir to said outer end faces, the surfaces of said elements, with the exception of said end faces, having a coating for preventing escape of lubricant therethrough, at least one of said elements having a lubricant conducting wick therein for conducting lubricant from said reservoir to the outer end face of the said element.

11. A self-lubricating bearing comprising a body member having a lubricant reservoir therein and a plurality of spaced apertures in a wall thereof, and a plurality of spaced elements sealed within said apertures and having inner end faces exposed to the supply of lubricant in said reservoir, and outer end faces, said outer end faces being disposed to engage a moving part and constituting the sole bearing surface of the bearing, said elements being of carbon material whereby to conduct lubricant from said reservoir to said outer end faces, the surfaces of said elements with the exception of said end faces, having a coating of metal, and at least one of said elements having a lubricant conducting wick therein for conducting lubricant from said reservoir to the outer end face of the said element.

12. A self-lubricating bearing comprising a metallic body member having a lubricant reservoir and a plurality of apertures in a wall thereof, and a plurality of spaced bearing elements of carbon material, said elements having their surfaces, with the exception of the inner and outer end faces, coated with metal, said elements being disposed within said apertures and being soldered to said body member, at least one of said elements having a lubricant conducting wick therein for conducting lubricant from said reservoir to the outer end face of the said element.

13. A self-lubricating bearing comprising a metallic body member having a sealed lubricant reservoir therein, a plurality of metallic cup shaped elements secured to said body member in sealed engagement and projecting into said reservoir, and a plurality of bearing elements of carbon material, said elements having portions tightly fitting within said cups with sealed engagement and being exposed through said cups to the lubricant in said reservoir and having portions extending from said cups, said latter portions having end faces constituting the sole bearing surface of said bearing, at least one of said bearing elements having an oil conducting wick embedded therein and extending into said reservoir.

HOWARD B. EYNON
MYRTICE C. BURR.